United States Patent
Kwak et al.

(10) Patent No.: US 10,172,129 B2
(45) Date of Patent: *Jan. 1, 2019

(54) METHOD OF MAPPING PHYSICAL RESOURCE TO LOGICAL RESOURCE IN WIRELESS COMMUNICATION SYSTEM

(71) Applicant: LG Electronics Inc., Seoul (KR)

(72) Inventors: Jin Sam Kwak, Anyang-si (KR); Hong Won Park, Anyang-si (KR); Sung Gu Cho, Anyang-si (KR); Ki Ho Nam, Anyang-si (KR); Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,668

(22) Filed: May 8, 2017

(65) Prior Publication Data

US 2017/0289982 A1 Oct. 5, 2017

Related U.S. Application Data

(63) Continuation of application No. 14/990,370, filed on Jan. 7, 2016, now Pat. No. 9,555,105, which is a (Continued)

(30) Foreign Application Priority Data

Sep. 21, 2007 (KR) .......................... 10-2007-0096625

(51) Int. Cl.
*H04W 72/04* (2009.01)
*H04L 5/00* (2006.01)
(Continued)

(52) U.S. Cl.
CPC ......... *H04W 72/044* (2013.01); *H04L 5/0007* (2013.01); *H04L 5/0039* (2013.01);
(Continued)

(58) Field of Classification Search
CPC .............. H04W 72/04; H04W 72/044; H04W 72/1263; H04W 72/005; H04J 11/00; H04J 13/0062
See application file for complete search history.

(56) References Cited

U.S. PATENT DOCUMENTS 7,986,613 B2 7/2011 Lomnitz
9,258,800 B2 2/2016 Kwak
(Continued)

FOREIGN PATENT DOCUMENTS

| EP | 1715705 A2 | 10/2006 |
| JP | 2000-013310 A | 1/2000 |
| WO | 2005/122425 A2 | 12/2005 |

*Primary Examiner* — Mohamed A Kamara
(74) *Attorney, Agent, or Firm* — Dentons US LLP

(57) ABSTRACT

A method of mapping a physical resource to a logical resource in a wireless communication system is described. The method includes dividing a physical frequency band into at least one frequency partition. Each frequency partition is divided into a localized region and a distributed region in a frequency domain. The method further includes mapping the at least one frequency partition into at least one logical resource unit. The localized region is directly mapped into the logical resource unit and the distributed region is mapped into the logical resource unit after rearranging subcarriers within the distributed region.

10 Claims, 7 Drawing Sheets

Related U.S. Application Data continuation of application No. 14/506,280, filed on Oct. 3, 2014, now Pat. No. 9,258,800, which is a continuation of application No. 14/107,964, filed on Dec. 16, 2013, now Pat. No. 9,204,427, which is a continuation of application No. 12/679,253, filed as application No. PCT/KR2008/005500 on Sep. 17, 2008, now Pat. No. 8,625,568.

(51) Int. Cl.
    *H04L 5/14*     (2006.01)
    *H04L 27/00*     (2006.01)
    *H04L 27/26*     (2006.01)
    *H04W 72/12*     (2009.01)
    *H04L 25/02*     (2006.01)

(52) U.S. Cl.
    CPC .......... *H04L 5/0041* (2013.01); *H04L 5/0044* (2013.01); *H04L 5/0092* (2013.01); *H04L 5/0094* (2013.01); *H04L 5/143* (2013.01); *H04L 27/0008* (2013.01); *H04L 27/2627* (2013.01); *H04W 72/04* (2013.01); *H04W 72/1263* (2013.01); *H04L 5/0051* (2013.01); *H04L 25/0224* (2013.01)

(56) References Cited

U.S. PATENT DOCUMENTS

| | | |
|---|---|---|
| 2002/0041635 A1* | 4/2002 | Ma ................. H04B 7/0619 375/267 |
| 2002/0176439 A1 | 11/2002 | Demerville et al. |
| 2005/0117539 A1 | 6/2005 | Song et al. |
| 2006/0156199 A1 | 7/2006 | Palanki |
| 2006/0229090 A1 | 10/2006 | Ladue |
| 2007/0094567 A1 | 4/2007 | Park |
| 2007/0189197 A1 | 8/2007 | Kwon et al. |
| 2007/0211658 A1 | 9/2007 | Gorokhov et al. |
| 2007/0293229 A1 | 12/2007 | Khan |
| 2008/0031191 A1 | 2/2008 | Kashima et al. |
| 2008/0095135 A1 | 4/2008 | Cleveland |
| 2008/0112308 A1 | 5/2008 | Cleveland |
| 2008/0159758 A1 | 7/2008 | Shpantzer et al. |
| 2008/0198911 A1 | 8/2008 | Hui et al. |
| 2009/0116434 A1 | 5/2009 | Lohr et al. |
| 2010/0009691 A1 | 1/2010 | Choi et al. |
| 2010/0020716 A1 | 1/2010 | Kuchibhotia et al. |
| 2010/0041445 A1 | 2/2010 | Qi et al. |
| 2010/0103896 A1 | 4/2010 | Cho et al. |
| 2011/0065468 A1 | 3/2011 | Parkvall et al. |

\* cited by examiner

[Fig. 1]
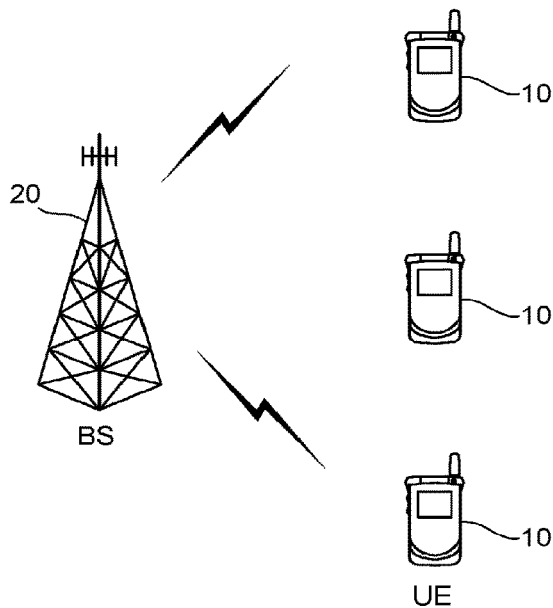
[Fig. 2]
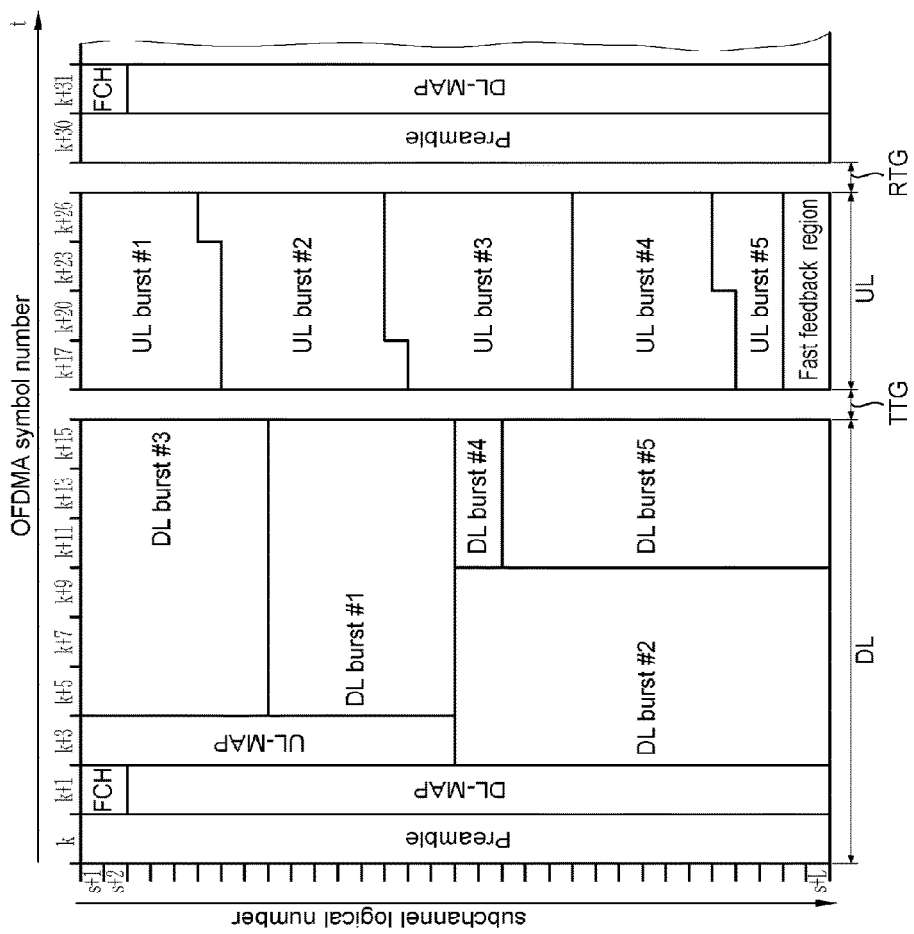

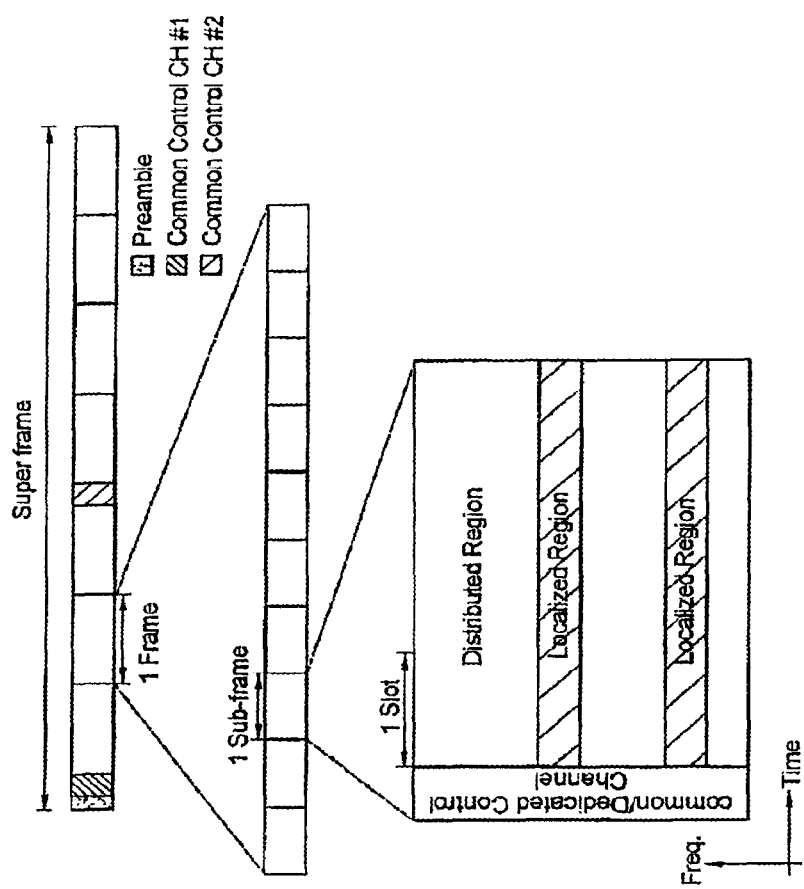
[Fig. 5]

[Fig. 6]
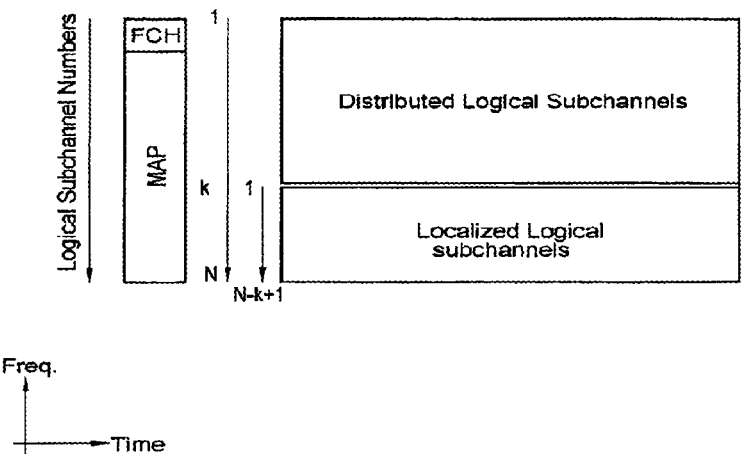
[Fig. 7]
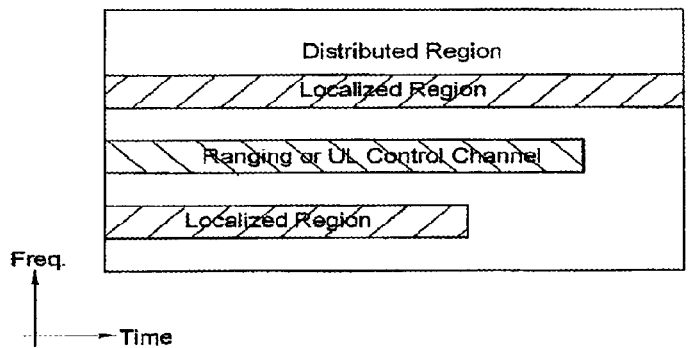
[Fig. 8]
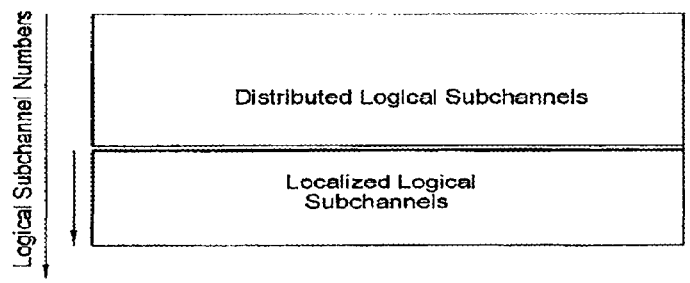

[Fig. 9]
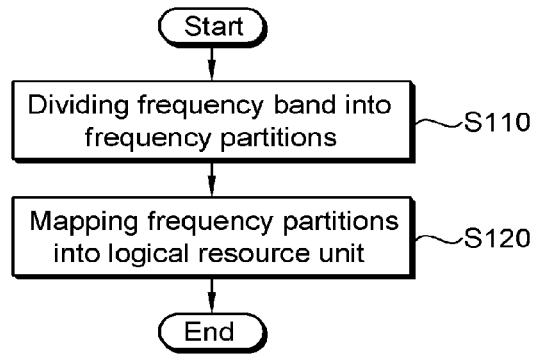
[Fig. 10]
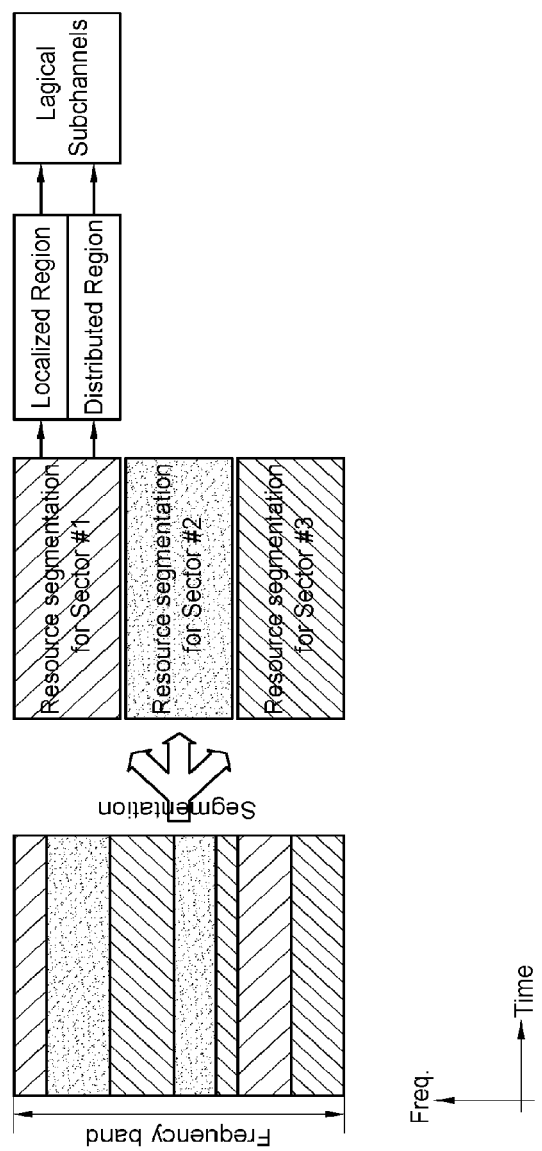

[Fig. 11]
| Basic Unit #0 | Basic Unit #k+1 | ... | Basic Unit #(n-1)k+1 |
|---|---|---|---|
| Basic Unit #1 | Basic Unit #k+2 | | Basic Unit #(n-1)k+1 |
| ⋮ | ⋮ | | ⋮ |
| Basic Unit #k-2 | Basic Unit #2k-2 | ... | Basic Unit #nk-2 |
| Basic Unit #k-1 | Basic Unit #2k-1 | | Basic Unit #nk-1 |
[Fig. 12]
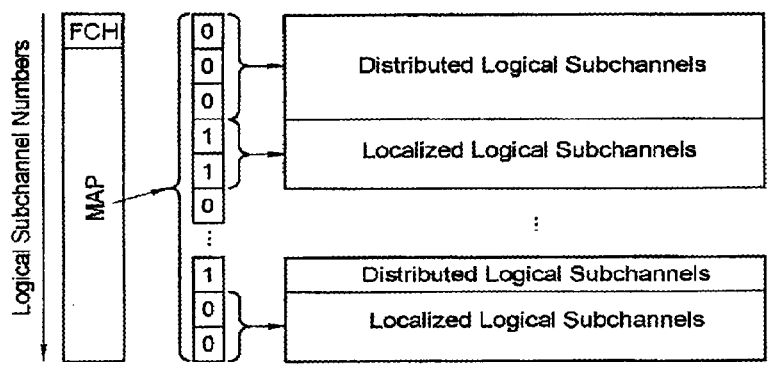
[Fig. 13]
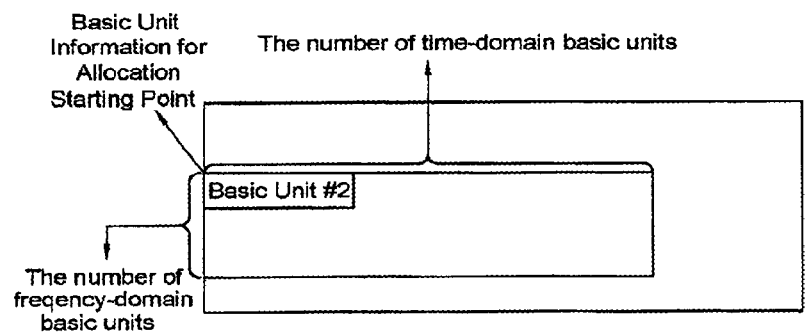

[Fig. 14]
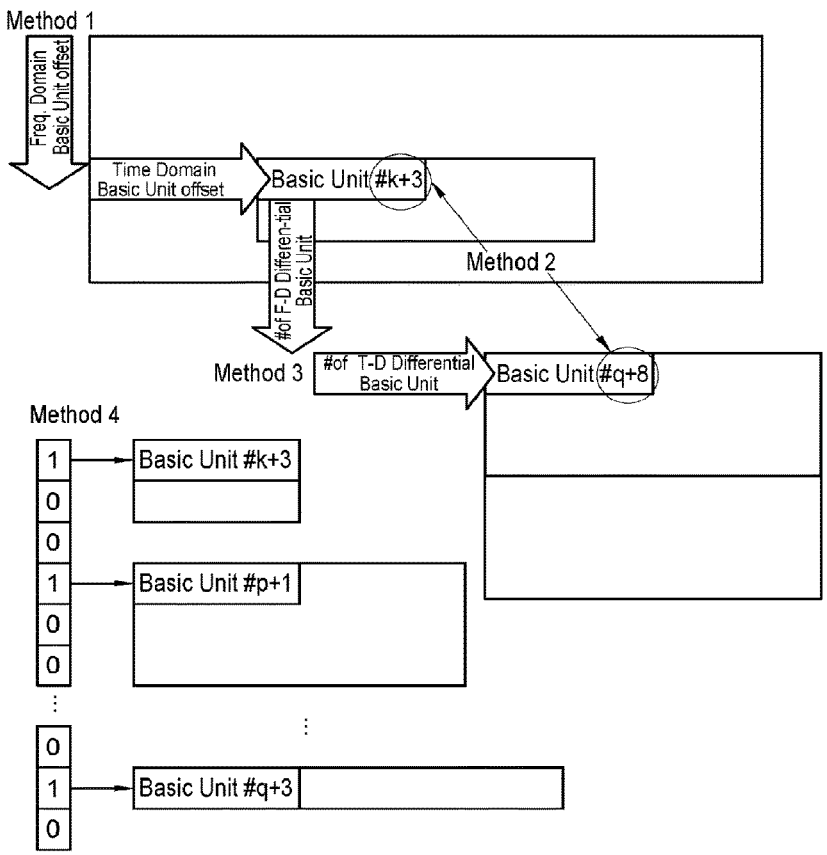
[Fig. 15]
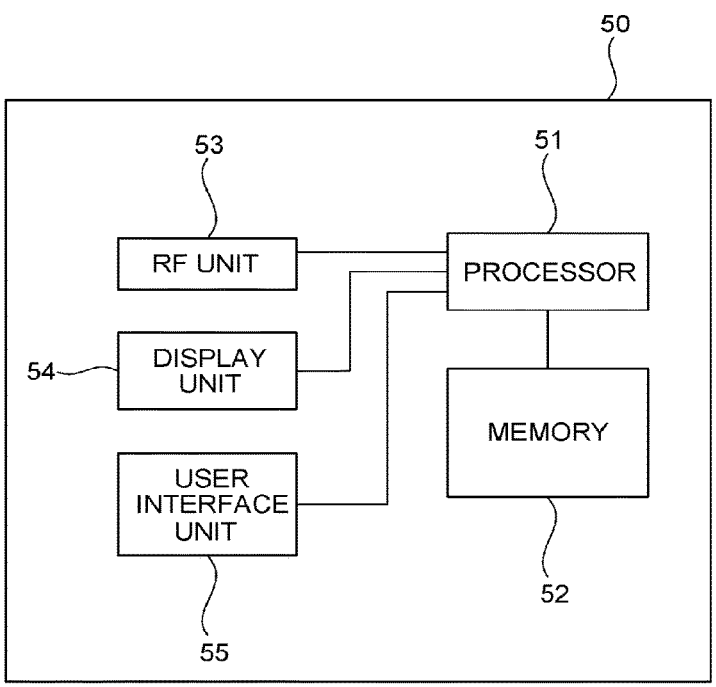

METHOD OF MAPPING PHYSICAL RESOURCE TO LOGICAL RESOURCE IN WIRELESS COMMUNICATION SYSTEM

This application is a Continuation of U.S. application Ser. No. 14/990,370 filed Jan. 7, 2016, which is a Continuation of U.S. application Ser. No. 14/506,280 filed Oct. 3, 2014 (now issued as U.S. Pat. No. 9,258,800 issued Feb. 9, 2016), which is a continuation of U.S. application Ser. No. 14/107,964 filed Dec. 16, 2013 (now issued as U.S. Pat. No. 9,204,427 issued Dec. 1, 2015), which is a continuation of U.S. application Ser. No. 12/679,253 filed Mar. 19, 2010 (now issued as U.S. Pat. No. 8,625,568 issued Jan. 7, 2014), which is a National Stage under 35 U.S.C. 371 of International Application No. PCT/KR2008/005500 filed Sep. 17, 2008, which claims priority of Korean Application No. 10-2007-0096625 filed Sep. 21, 2007, all of which are hereby incorporated by reference in their entirety.

BACKGROUND

Field of the Disclosure

The present invention relates to wireless communications, and more particularly, to a method of mapping a physical resource to a logical resource.

Discussion of the Related Art

A wireless communication system is widely used to provide various types of communication services. For example, the wireless communication system provides voice and/or data services. The wireless communication system can use a frequency division duplex (FDD) scheme or a time division duplex (TDD) scheme. In the FDD scheme, uplink transmission and downlink transmission are achieved at the same time point while occupying different frequency bands. In the TDD scheme, uplink transmission and downlink transmission are achieved at different time points while occupying the same frequency band.

In order to effectively use limited radio resources in the wireless communication system, there are proposed methods and utilization for further effective transmission and reception in time, space, and frequency domains. Orthogonal frequency division multiplexing (OFDM) uses a plurality of orthogonal subcarriers. Further, the OFDM uses orthogonality between inverse fast Fourier transform (IFFT) and fast Fourier transform (FFT). A transmitter transmits data by performing the IFFT. A receiver restores original data by performing the FFT on a received signal. The transmitter uses the IFFT to combine the plurality of subcarriers. The receiver uses the FFT to split the plurality of subcarriers. According to the OFDM, complexity of the receiver can be reduced in a frequency selective fading environment of a broadband channel, and spectral efficiency can be increased when selective scheduling is performed in a frequency domain by using a channel characteristic which is different from one subcarrier to another. Orthogonal frequency division multiple access (OFDMA) is an OFDM-based multiple access scheme. According to the OFDMA, efficiency of radio resources can be increased by allocating different subcarriers to multiple users.

The institute of electrical and electronics engineers (IEEE) 802.16 standard group was established in 1999 for broadband wireless access (BWA) standardization. A Wireless MAN-OFDMA standard has recently been defined to use the OFDMA. At present, a logical frame structure of an IEEE 802.16-2004 system uses the TDD scheme in which a downlink frame and an uplink frame are separated by a guard time.

Accordingly, there is a need for a method capable of transmitting data by using a frame having a shorter length than a frame structure of the TDD scheme in consideration of improvement of cell coverage, maximization of spectral efficiency, improvement of efficiency for mobility support, improvement of latency, etc.

SUMMARY OF THE INVENTION

The present invention provides a method of mapping a physical resource to a logical resource.

According to an aspect of the present invention, there is provided a method of mapping a physical resource to a logical resource in a wireless communication system is provided, the method including: dividing a physical frequency band into at least one frequency partition, wherein each frequency partition is divided into a localized region and a distributed region in a frequency domain; and mapping the at least one frequency partition into at least one logical resource unit, wherein the localized region is directly mapped into the logical resource unit and the distributed region is mapped into the logical resource unit after rearranging subcarriers within the distributed region.

According to another aspect of the present invention, there is provided a transmitter including: a radio frequency (RF) unit transmitting an RF signal; and a processor that is connected to the RF unit, divides a physical frequency band into at least one frequency partition, and maps the at least one frequency partition into at least one logical resource unit, wherein each frequency partition is divided into a localized region and a distributed region in a frequency domain, the localized region is directly mapped into the logical resource unit and the distributed region is mapped into the logical resource unit after rearranging subcarriers within the distributed region.

According to the present invention, a distributed subcarrier allocation scheme and a localized subcarrier allocation scheme are supported in a subframe to increase efficiency of frequency resources.

BRIEF DESCRIPTION OF THE DRAWINGS

FIG. 1 shows a wireless communication system.

FIG. 2 shows an example of a frame structure.

FIG. 5 shows a subframe structure according to an embodiment of the present invention.

FIG. 6 shows a logical frame for a physical frame of FIG. 5.

FIG. 7 shows a frame structure according to another embodiment of the present invention.

FIG. 8 shows a logical frame for a physical frame of FIG. 7.

FIG. 9 is a flowchart showing a method of mapping a physical resource to a logical resource according to an embodiment of the present invention.

FIG. 10 shows segmentation supporting frequency reuse according to an embodiment of the present invention.

FIG. 11 shows a resource allocation unit according to an embodiment of the present invention.

FIG. 12 shows a method of dividing a data region according to an embodiment of the present invention.

FIG. 13 shows a method of dividing a data region according to another embodiment of the present invention.

FIG. 14 shows a method of determining a start position of a data region according to an embodiment of the present invention.

FIG. 15 is a block diagram showing constitutional elements of a user equipment.

DETAILED DESCRIPTION OF THE PREFERRED EMBODIMENTS

Figure 3:
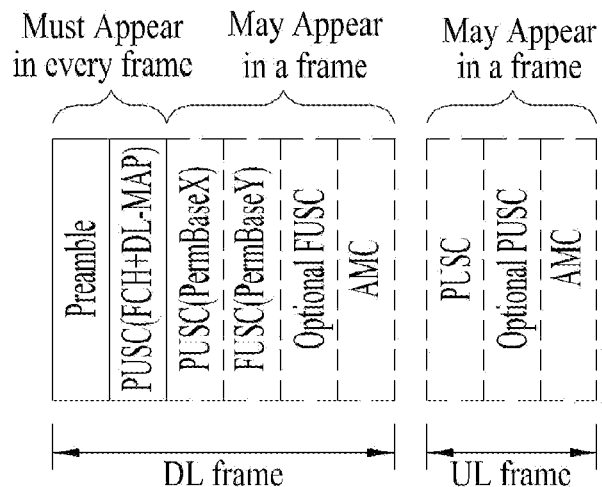
FIG. 3 shows an example of a frame including a plurality of permutations.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink denotes a communication link from the BS 20 to the UE 10, and an uplink denotes a communication link from the UE 10 to the BS 20. In downlink, a transmitter may be a part of the BS 20, and a receiver may be a part of the UE 10. In uplink, the transmitter may be a part of the UE 10, and the receiver may be a part of the BS 20.

There is no restriction on multiple access schemes used in the wireless communication system. Various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc.

FIG. 2 shows an example of a frame structure. A frame is a data sequence used according to a physical specification in a fixed time duration. This may be found in section 8.4.4.2 of "Part 16: Air Interface for Fixed Broadband Wireless Access Systems" in the institute of electrical and electronics engineers (IEEE) standard 802.16-2004 (hereinafter, Document 1).

Referring to FIG. 2, the frame includes a downlink (DL) frame and an uplink (UL) frame. In a time division duplex (TDD) scheme, UL and DL transmissions are achieved at different time points but share the same frequency band. The DL frame is temporally prior to the UL frame. The DL frame sequentially includes a preamble, a frame control header (FCH), a DL-MAP, a UL-MAP, and a burst region. Guard times are provided to identify the UL frame and the DL frame and arc inserted to a middle portion (between the DL frame and the UL frame) and a last portion (next to the UL frame) of the frame. A transmit/receive transition gap (TTG) is a gap between a downlink burst and a subsequent uplink burst. A receive/transmit transition gap (RTG) is a gap between an uplink burst and a subsequent downlink burst.

A preamble is used between a BS and a UE for initial synchronization, cell search, and frequency-offset and channel estimation. An FCH includes information on a length of a DL-MAP message and a coding scheme of the DL-MAP.

The DL-MAP is a region for transmitting the DL-MAP message. The DL-MAP message defines access to a DL channel. The DL-MAP message includes a configuration change count of a downlink channel descriptor (DCD) and a BS identifier (ID). The DCD describes a downlink burst profile applied to a current MAP. The downlink burst profile indicates characteristics of a DL physical channel. The DCD is periodically transmitted by the BS by using a DCD message.

The UL-MAP is a region for transmitting a UL-MAP message. The UL-MAP message defines access to a UL channel. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of a UL physical channel and is periodically transmitted by the BS by using a UCD message.

Hereinafter, a slot is a minimum unit of possible data allocation, and is defined with a time and a subchannel. The number of subchannels depends on a fast Fourier transform (FFT) size and time-frequency mapping. Each subchannel includes a plurality of subcarriers. The number of subcarriers included in each subchannel differs according to a permutation rule. Permutation denotes mapping from a logical subchannel to a physical subcarrier. In full usage of subchannels (FUSC), each subchannel includes 48 subcarriers. In partial usage of subchannels (PUSC), each subchannel includes 24 or 16 subcarriers. A segment denotes at least one subchannel set.

In order for data to be mapped to physical subcarriers in a physical layer, two steps are generally performed on the data. In a first step, the data is mapped to at least one data slot on at least one logical subchannel. In a second step, each logical subchannel is mapped to a physical subcarrier. This is called permutation. Examples of the permutation rule employed in the Document 1 above (i.e., the IEEE 802.16-2004 standard) include FUSC, PUSC, optional-FUSC (O-FUSC), optional-PUSC (O-PUSC), adaptive modulation and coding (AMC), etc. A set of OFDM symbols using the same permutation rule is referred to as a permutation zone. One frame includes at least one permutation zone.

The FUSC and the O-FUSC are used only in downlink transmission. The FUSC consists of one segment including all subchannel groups. Each subchannel is mapped to a physical subcarrier distributed over the entire physical channel. This mapping varies for each OFDM symbol. A slot consists of one subchannel on one OFDM symbol. The O-FUSC uses a pilot allocation scheme different from that used in the FUSC.

The PUSC is used both in downlink transmission and uplink transmission. In downlink, each physical channel is divided into clusters, each of which includes 14 contiguous subcarriers on two OFDM symbols. The physical channel is mapped to six groups. In each group, pilots are allocated in fixed positions to each cluster. In uplink, subcarriers are divided into tiles, each of which includes four contiguous physical subcarriers on three OFDM symbols. The subchannel includes six tiles. Pilots are allocated to the corners of each tile. The O-PUSC is used only in uplink transmission. Each tile includes three contiguous physical subcarriers on three OFDM symbols. Pilots are allocated to the center of each tile.

FIG. 3 shows an example of a frame including a plurality of permutations. The frame may be a physical frame.

Referring to FIG. 3, in a DL frame, a preamble, an FCH, and a DL-MAP must appear in every frame. A PUSC permutation is applied to the FCH and the DL-MAP. A PUSC permutation, an FUSC permutation, an optional FUSC permutation, and an AMC permutation may appear in the DL frame. The permutations appeared in the DL frame can be specified in the DL-MAP. A PUSC permutation, an optional PUSC, and an AMC permutation may appear in a UL frame. The permutations appeared in the UL frame can be specified in a UL-MAP.

Data or control information in frames can be accurately obtained by using the preamble, the FCH, the DL-MAP, or the like included in each frame.

A BS can use a part of frequency band by dividing the whole frequency band. For example, neighboring BSs may use different frequency bands to avoid inter-BS interference. Alternatively, one BS may divide one cell into a plurality of sectors so that different frequency bands are used by the respective sectors. As such, frames can be transmitted for each divided frequency band.

Figure 4:
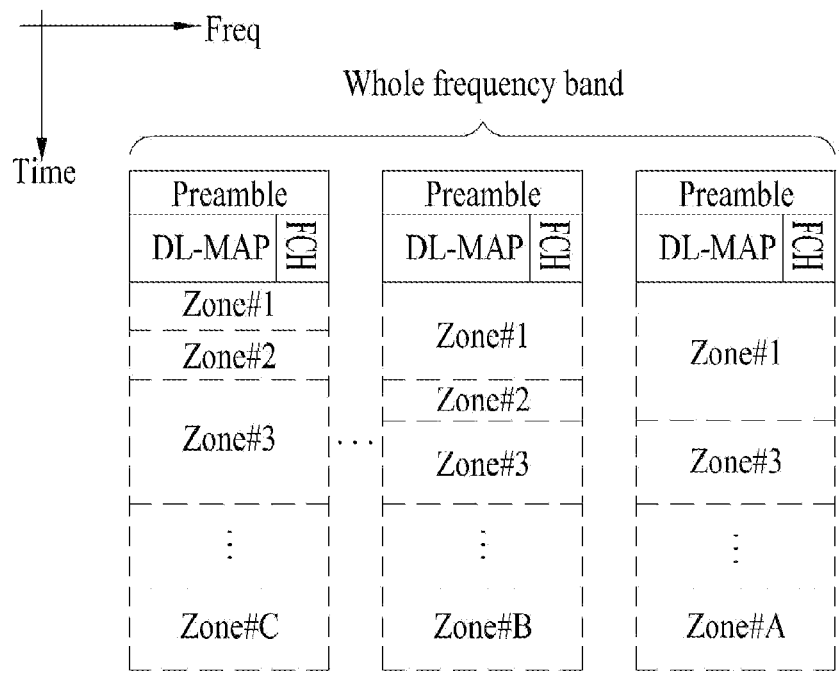
FIG. 4 shows an example of a frame generated in every frequency band by dividing a whole frequency band.

FIG. 4 shows an example of a frame generated in every frequency band by dividing a whole frequency band. This is a case where frames having the same format are generated and transmitted in respective frequency bands.

Referring to FIG. 4, the whole frequency band can be divided into a plurality of frequency bands so that frames can be generated and transmitted in the respective frequency bands. In this case, the respective frequency bands may be used by different BSs. Alternatively, the respective frequency bands may be used by one BS in difference sectors. The respective frequency bands may be either contiguous frequency bands or scattered frequency bands on the whole frequency band. In each frequency band, a frame can be generated and transmitted using one system. That is, data can be transmitted through a frame having the same format in each frequency band.

The whole frequency band can be divided into a plurality of frequency bands so that frames with different formats are generated and transmitted in the respective frequency bands. The frames can be generated and transmitted using other systems in the respective frequency bands. When the frames are generated and transmitted using other systems in an arbitrary frequency band, there is a need to process signals repetitively or independently. As a result, there may be a restriction on the effective use of limited radio resources. In particular, a head portion of a control signal causes a significant overhead since the head portion of the control signal is repeated in each frame, thereby decreasing a data transfer amount of the system. In addition, when the frames of other systems are used, it is difficult to configure a channel having a structure flexible in various bandwidths.

Accordingly, when transmitting data, a frame length needs to be shorter than that of a TDD-based frame. A frequency division duplex (FDD) structure may have a shorter frame length than the TDD structure. For example, when the TDD-based frame has a length of 5 msec, a frame (i.e., region) for supporting FDD can have a length of 1 to 3 msec. Conditions to be considered in the designing of a new frame are as follows.

(1) A distributed or localized subcarrier allocation scheme is supported within a single frame.

(2) A subcarrier subchannel allocation scheme is easily used in a structure of the frame.

(3) Ranging or control signal transport channels using localized subband allocation within an uplink frame is supported to provide an improved coverage.

(4) An overhead of MAP information on resources allocated to each UE is minimized.

(5) Unlike the conventional TDD-based control information transmission scheme, hierarchical control information capable of supporting a transmission time interval (TTI) can be transmitted.

(6) A conventional system can be supported within a conventional frequency band.

(7) The conventional system co-exists with a new system in a single frequency band.

(8) Performance deterioration does not occur in a UE of the conventional system coexisting with the new system.

(9) The new system can independently operate, and generation of additional control signals is minimized.

(10) A channel structure can be supported in a flexible manner within a contiguous or scattered frequency band.

(11) The control signal can be easily supported by a single-mode UE supporting one system and a dual-mode UE supporting two or more systems.

The frame is designed to satisfy all or some of the aforementioned conditions.

FIG. 5 shows a subframe structure according to an embodiment of the present invention. The subframe is a downlink frame that can indicate frequency-time physical resource allocation.

Referring to FIG. 5, a physical frame includes a control channel region and/or a data region.

The control channel region may be a common control channel and/or a dedicate control channel. The common control channel is used to transmit control information that can be commonly utilized by UEs. The control information may be system configuration information which is common within a whole or part of a subframe, a frame, or a super-frame. The super-frame may consist of one or more frames. The frame may consist of one or more subframes. A three hierarchical frame configuration can be optionally configured in one or more layers. The dedicated control channel is utilized to transmit control information required for a specific UE. A BS can optionally utilize the dedicated control channel to transmit system configuration information or resource allocation information for a specific UE.

The data region includes a distributed region and/or a localized region. The distributed region and the localized region include a plurality of subcarriers in a frequency domain and include a plurality of OFDM symbols in a time domain. The distributed region and the localized region can be distinguished in the frequency domain. That is, the distributed region and the localized region use a frequency division method. The distributed region and the localized region may use different permutation rules. In one slot (or one subframe) unit, the distributed region and/or the localized region may occupy different frequency bands. A distributed subcarrier allocation scheme and/or a localized subcarrier allocation scheme can be used within one slot constituting the subframe. In the distributed subcarrier allocation scheme, a plurality of subcarriers constituting one piece of data are mapped in the data region in a distributed manner. In the localized subcarrier allocation scheme, a plurality of subcarriers constituting one piece of data are mapped in a consecutive manner. Since the distributed subcarrier allocation scheme and the localized subcarrier allocation scheme are supported in the frequency domain within one slot or one frame, efficiency of frequency resources can be increased.

A plurality of frames can constitute one super-frame. It is assumed herein that one super-frame includes 7 frames. However, this is for exemplary purposes only, and the number of frames included in the super-frame is not limited thereto. One frame can be transmitted in one transmission time interval (TTI) which is a time for concurrently transmitting data. Alternatively, one subframe can be transmitted in one TTI. $1^{st}$ to $7^{th}$ frames are transmitted in a temporal order. The BS can transmit the super-frame by including a preamble or a first common control channel (i.e., common control CH #1) in the $1^{st}$ frame of the super-frame. Further, the BS can transmit the super-frame by including a second common control channel (i.e., common control CH #2) in the $4^{th}$ frame of the super-frame. The dedicated control channel can be included in the remaining frames. The BS can report information on the 7 frames included in the super-frame by using the common control CH #1. The BS can report information on the remaining frames transmitted later by using the common control CH #2.

As described above, the preamble is included only in the 1st frame of the super-frame, and control information on radio resources allocated to the UE is not reported in every frame but reported through hierarchical mapping by being included only in some frames. Accordingly, an overhead caused by the control signal can be reduced. In addition, a multi-user diversity gain and a frequency diversity gain can be effectively obtained by separating the data region according to the frequency division method during a short frame duration.

FIG. 6 shows a logical frame for the physical frame of FIG. 5. The logical frame may be a logical downlink frame.

Referring to FIG. 6, the logical frame can be generated by performing logical mapping from the physical frame. The physical frame can be generated by performing physical mapping from the logical frame. The physical frame and the logical frame correspond to each other. A BS and a UE may know in advance information on physical mapping and logical mapping.

The logical frame can include a MAP, an FCH, and a logical subchannel region. A control channel region of the physical frame is logical-mapped to the MAP and the FCH. The MAP and the FCH can be temporally prior to the logical subchannel region. The logical subchannel region includes a plurality of subchannels. The subchannel is a logical resource unit for resource allocation. A distributed region of the physical frame is mapped to a distributed logical subchannel region. A localized region of the physical frame is mapped to a localized logical subchannel region. In the mapping from the distributed region to the distributed logical subchannel region, subcarriers are distributed according to a specific permutation. Mapping from the localized region to the localized logical subchannel region can be directly performed without the use of the permutation.

The logical frame can determine logical subchannel numbers in the frequency domain. The logical subchannel number can be a subchannel index to be informed to the UE. The logical subchannel number for the distributed logical subchannel region and the logical subchannel number for the localized logical subchannel may be numbers which are numbered starting from the same starting point or different starting points. For example, if it is assumed that N logical subchannels are present in the frequency domain, the distributed logical subchannel number can be set to a number in the range of 1 to N belonging to the distributed logical subchannel region. The localized logical subchannel number can be set to a number in the range of k to N ($1 \leq k \leq N$) belonging to the localized logical subchannel region. Alternatively, the localized logical subchannel number can be set to a number in the range of 1 to N−k+1 by numbering a new number starting from a first subchannel of the localized logical subchannel region.

When the BS reports the logical subchannel number to the UE, the UE can find a resource region allocated to the UE so as to transmit or receive data by using the logical subchannel number. When a frequency resource region allocated to the UE is consecutively allocated to be used during a specific time period (e.g., single/multiple frame numbers), the BS can report only the logical subchannel number to the UE. That is, the BS can represent an indicator for a downlink burst (or uplink burst) allocated to the UE only with the logical subchannel number. In comparison with a 2-dimensional indicator indicating the resource region allocated to the UE with the frequency domain and the time domain, the use of a 1-dimensional indicator indicating the resource region only with the logical subchannel number can reduce an overhead caused by transmission of resource allocation information.

Optionally, one frame can be one distributed logical subchannel region or one localized logical subchannel region of the whole frequency band, or the whole frequency band can be segmented within one frame along a time or frequency domain to constitute the distributed or localized logical subchannel. That is, a subchannel configuration method considered in a legacy system can be directly used within one frame. The legacy system may be an IEEE 802.16e system or a WiMAX system. However, the present invention is not limited thereto, and thus the legacy system may be any conventional system. The proposed subchannel configuration method may be used alone or in combination with the subchannel configuration method of the legacy system. Since the frame configuration method of the legacy system and the proposed frame configuration method can be combined to be used, the frame can be configured in a flexible manner.

FIG. 7 shows a frame structure according to another embodiment of the present invention. The frame is an uplink frame that can indicate frequency-time physical resource allocation.

Referring to FIG. 7, a physical frame includes a data region and/or a ranging or UL control channel region. The data region includes a distributed region and a localized region. The ranging region is used to transmit a ranging preamble of a UE. The ranging or UL control channel region, the distributed region, and the localized region are separated in a frequency domain. That is, the ranging or UL control channel region, the distributed region, and the localized region use a frequency division method. The respective regions can use different permutation rules. In addition, some subchannels corresponding to the distributed or localized region can be allocated to the ranging or UL control channel.

FIG. 8 shows a logical frame for the physical frame of FIG. 7. The logical frame may be an uplink frame. The logical frame is constituted by performing logical mapping from the physical frame.

Referring to FIG. 8, the logical frame includes an uplink or downlink burst. A distributed region of the physical frame is mapped to a distributed logical subchannel region. A localized region of the physical frame is mapped to a localized logical subchannel region.

A ranging or UL control channel can be influenced by a configuration method of the UL control channel in a legacy system. A pre-assigned frequency domain needs to be spanned and transmitted during a plurality of OFDM symbol durations. Therefore, in a method of allocating resources within a frame, the distributed logical subchannel region and the localized logical subchannel region can be configured for a frequency-time resource region except for the ranging or UL control channel region. In the logical frame, the logical subchannel numbers can be determined as described in FIG. 6 above. A BS can transmit information regarding the ranging or UL control channel region through a common control channel of a downlink frame. If the common control channel is included in some of frames included in a superframe, the configured logical uplink frame may not include information regarding the ranging or UL control channel region.

The aforementioned frame structure is for exemplary purposes only, and thus the present invention is not limited thereto. In the physical frame, locations and sizes of the distributed region, the localized region, and the control channel are not fixed but are variable within subframes. In the logical frame, locations and sizes of the distributed logical subchannel and the localized logical subchannel are not fixed but are variable within subframes. If the frame of FIG. 5 is a downlink frame and the frame of FIG. 7 is an uplink frame, the uplink frame and the downlink frame can configure subframes by using not only the TDD scheme but also the FDD scheme.

To allocate frequency-time resources in a flexible manner, there is a need to reduce an overhead of resource allocation information provided from a control channel transmitted in one or more frame units. That is, in order for the BS to report resources allocated to each UE by using an index of the logical subchannel, there is a need for an effective method of configuring resource allocation information for the distributed region and the localized region. In addition, an effective method of resource allocation is required for the case where different frame configuration methods are used within an FDD band.

Hereinafter, a method of flexible resource allocation for configuring the proposed frame will be described. In the proposed frame, two or more permutation rules can be considered within one OFDM symbol or one slot or one subframe. For this, a subchannel can be configured by segmenting a physical frequency-time resource region into a distribute region and a localized region. Accordingly, a downlink or uplink burst is formed by allocating a logical subchannel to a UE.

FIG. 9 is a flowchart showing a method of mapping a physical resource to a logical resource according to an embodiment of the present invention.

Referring to FIG. 9, a physical frequency band is divided into at least one frequency partition (step S110). The physical frequency band includes a plurality of subcarriers. The plurality of subcarriers can be rearranged according to a specific permutation and thus can be distributed over the frequency partition. The frequency partition can be classified into a distributed region and a localized region. The distributed region can be used to obtain a frequency diversity gain. The localized region can be used to obtain a frequency selective gain. The physical frequency band can be divided into at least one frequency partition according to a frequency reuse factor. Frequency reuse is achieved by allocating a physical frequency by segmenting the physical frequency with respect to each sector. By segmenting each sector, inter-cell interference can be reduced and data transfer reliability can be improved.

The frequency partition is mapped into a logical resource unit (step S120). The logical resource unit denotes a basic unit for allocating a logical resource. In addition, the logical resource unit denotes a basic unit for mapping from a physical resource to a logical resource. For example, the logical resource unit may be a distributed logical subchannel or a localized logical subchannel. A localized region can be directly mapped into the logical resource unit. A distributed region can be mapped into the logical resource unit by rearranging subcarriers included in the distributed region according to a specific permutation rule.

A process of mapping the physical resource to the logical resource can be performed according to some or all of the following steps. As a result, uplink and/or downlink resource allocation control information can be configured.

<Physical Frequency-Time Resource Allocation>

(1) Application of segmentation supporting frequency reuse (2) Reserved ranging or UL control channels (UL resource allocation ONLY) (3) Determination of resource allocation unit (4) Frequency band separation—distributed/localized region <Logical Frequency-Time Resource Allocation>

(5) Distributed/localized sub-channelization using the pre-defined permutation rules (6) Assignment of logical subchannel indices to mobile terminals (7) Data mapping on the assigned logical subchannels (1) Application of Segmentation Supporting Frequency Reuse FIG. 10 shows segmentation supporting frequency reuse according to an embodiment of the present invention. This segmentation is physical frequency-time resource segmentation.

Referring to FIG. 10, frequency-time resources can be segmented and allocated within a frame. A physical frequency band can be segmented and allocated for each sector within the frame. By segmenting each sector, inter-cell interference can be reduced and data transfer reliability can be improved. For example, when using a dedicated control channel, a control signal can be transmitted by increasing frequency reuse of a band robust to the inter-cell interference in order to guarantee quality of service (QoS) and to improve reliability. However, a throughput may be decreased due to deterioration of spectral efficiency, and additional control signal transmission may be requested for inter-cell frequency allocation.

Such segmentation can be analyzed as a method of configuration from a physical resource to a logical resource, and can be extensively applied to a method of configuring a subchannel. That is, as in the case of segmenting the physical frequency band for each sector, the physical resource can be divided into at least one frequency partition. In this case, a specific permutation rule can be used when the physical resource is segmented into the frequency partition. For example, the physical resource can be divided with various sizes in a frequency domain, and the physical resource divided in the frequency domain can be rearranged according to a permutation. The rearranged physical resource is segmented into a plurality of frequency partitions. Each frequency partition can be independently divided into a distributed region and/or a localized region. The distributed region and the localized region of each frequency partition are mapped to a logical subchannel. The logical subchannel can be divided into a distributed logical subchannel region and a localized logical subchannel region. The distributed region can be mapped to the distributed logical subchannel region. The localized region can be mapped to the localized logical subchannel region.

(2) Reserved Ranging or UL Control Channels (UL Resource Allocation Only)

In case of uplink, a specific frequency band can be pre-assigned to be used for improvement of coverage and improvement of reliability of control signals and multiplexing capability. In this case, subsequent processes are performed on remaining regions other than the pre-assigned frequency domain for the ranging or control channel in a physical frequency-time resource structure allocated by performing segmentation or the like.

(3) Determination of Resource Allocation Unit

FIG. 11 shows a resource allocation unit according to an embodiment of the present invention.

Referring to FIG. 11, a physical frequency-time region is configured through segmentation except for a ranging or UL control channel region. The physical frequency-time region needs to be allocated by dividing it into a distributed region and a localized region. A basic unit for distributed/localized resource allocation needs to be defined to effectively indicate resource regions. The basic unit may be a physical resource unit for allocating physical resources. The basic unit may include a plurality of subcarriers in a frequency domain and at least one OFDM symbol in a time domain. For example, the basic unit may be a slot or a resource block. In a logical resource, the basic unit may be a logical resource unit for allocating logical resources. In the logical resource, the basic unit may be a subchannel.

The basic unit may be represented using a 2-dimensional configuration method specifying a frequency and a time or a 1-dimensional configuration method specifying a frequency or a time. A 1-dimensional basic unit may be represented by specifying a frequency band such as a subchannel index or a subcarrier index or by specifying a time band such as an OFDM symbol or a slot index. The 1-dimensional basic unit can be easily applied using a 2-dimensional basic unit. For simplicity, the 2-dimensional basic unit will be described hereinafter.

The 2-dimensional basic unit can include one or more consecutive subcarriers and OFDM symbols in a frequency-time domain. By increasing the size of the 2-dimensional basic unit, an overhead of resource allocation information can be decreased but a multi-user gain or a frequency selective scheduling gain through resource allocation may also be decreased. Therefore, the basic unit has to be designed by considering a radio channel characteristic so as to decrease the overhead and to obtain effective additional gains. For this, the frequency domain of the basic unit can be determined within a coherence bandwidth by considering a delay spread resulted from a multi-path channel characteristic. In addition, the time domain of the basic unit can be determined within a coherence time by considering a time-variant channel characteristic which is taken into account in an environment where a mobile object moves with a high-speed. For example, the basic unit may consist of a maximum of 16 consecutive subcarriers in the frequency domain and a maximum of 4 consecutive OFDM symbols in the time domain. In particular, the basic unit of the frequency domain can be defined variously according to an FFT size. For a small-sized FFT (e.g., 128 FFT size), a basic unit for a frequency domain having a relatively narrow range can be configured. For a relatively larger-sized FFT (e.g., 2048 FFT size), a basic unit for a frequency domain having a wide range can be configured. In addition, a basic unit for a time domain having one subchannel or a time domain for forming a predetermined number of subchannels (where the predetermined number is an integer multiple) can be configured, and also can be utilized for data region segmentation.

One frame can be segmented into a plurality of 2-dimensional basic units. A number (i.e., index or indicator) can be numbered to indicate the segmented basic units. The number is sequentially numbered for the segmented basic units along the frequency domain, and can be extensively applied along the time domain. This is for exemplary purposes only, and thus the numbering on the basic units may be achieved in various manners. Numbering may be sequentially performed first on the time domain for the segmented basic units and then may be extensively applied to the frequency domain. Alternatively, random numbering can be performed on the basic unit according to an arbitrary or predetermined interleaving scheme. Accordingly, there may be an advantage in that a diversity effect can be obtained in the time or frequency domain and influence of inter-cell interference can be decreased.

(4) Frequency Band Separation—Distributed/Localized Region

Frequency band separation can be achieved using a basic unit. Information on a data region can be transmitted through a control channel (or dedicated control channel) transmitted in one or more frames. A method of dividing the data region and a frame structure of a legacy system can be used in the proposed frame structure.

First, a legacy frame structure using an FCH and a MAP in the legacy system will be described. When a plurality of permutation zones are allocated and utilized in a frame structure having a shot length, system efficiency can be improved in comparison with a TDD-based frame structure. Disadvantageously, however, an overhead of control information and a scheduler complexity can be increased. It may be important to consider a method capable of supporting FDD while maintaining the legacy frame structure in terms of backward compatibility with the legacy system. Therefore, it is preferable to extensively apply additional functions while maintaining the conventional method of configuring control information of a frame. For example, the control information may be configured using the conventional downlink frame prefix (DLFP) and MAP, and additional functions may be extensively applied. Thus, a frame can be configured with a new format while maintaining the legacy frame configuration method. As shown in FIG. 3, for one or more OFDM symbols at a start position of the frame, the FCH and the DL-MAP can be transmitted using a permutation rule applied in the legacy system. The FCH can indicate whether the conventional legacy frame structure or the proposed frame structure will be used. A mode indicator indicates a legacy mode in which the legacy frame structure is applied and a new mode in which the proposed frame structure is applied. The mode indicator can be expressed as follows.

$$\text{Mode Indicator} = \begin{pmatrix} 0, & \text{legacy mode} \\ 1, & \text{New mode} \end{pmatrix}$$

This is for exemplary purposes only. Thus, the legacy mode may be indicated when the mode indicator is '1', and the new mode may be indicated when the mode indicator is '0'. Migration between the legacy mode and the new mode can be achieved by adding the mode indicator in this manner to determine a configuration method of a corresponding frame. 1-bit mode information can be transmitted through the FCH, the common control channel, the preamble, etc.

Even if the conventional legacy mode is directly used, configuration of a plurality of permutation zones during a short frame length may be ineffective. In this case, in addition to a permutation rule applied in the control channel, there is a need to apply one or two zones to the data region through segmentation. In this case, 2-dimensional resource allocation information (i.e., an OFDMA symbol offset+a subchannel offset+the number of subchannels+the number of OFDMA symbols) of a frequency-time domain conventionally used to indicate a downlink burst in the DL-MAP can be transmitted, which may lead to increase in an overhead of a downlink control signal. If it is assumed that a downlink burst region is allocated by being separated along a frequency domain within a permutation zone, DL-MAP information can be configured only with a subchannel offset and a value indicating the number of subchannels. In case of uplink, a slot duration used by an uplink burst can be used for region identification, and each UE can identify its burst through accumulation of slot durations allocated to other UEs. In this case, the uplink burst may be identified with a logical subchannel index or may be identified with a subchannel offset and a value indicating the number of subchannels.

Now, allocation of a new data region based on a basic unit will be described. A concept of the permutation zone of the legacy system can be extended to additionally divide a data region so that a distributed resource allocation scheme and a localized resource allocation scheme can be used together in one resource region. In this case, control information indicating whether a conventional or new resource allocation scheme will be used within a frame may be indicated by using an FCH or a DL-/UL-MAP so that configuration is achieved using the conventional or new resource allocation scheme within the frame.

Information for identifying a distributed data region or a localized region within the frame can be transmitted by considering predetermined basic unit numbering according to a 1-dimensional division method or a 2-dimensional division method.

FIG. 12 shows a method of dividing a data region according to an embodiment of the present invention. This is a 1-dimensional division method specifying a frequency domain.

Referring to FIG. 12, one subframe can be divided into a distributed region and a localized region in the frequency domain. The distributed region and the localized region can be divided from at least one frequency partition segmented according to a specific permutation rule. For the distributed region and the localized region, the divided frequency domain can be used within one frame to decrease an overhead of resource allocation control information by considering a short subframe length. In control information such as a DL/UL-MAP, division information of the frequency domain can be reported using 1-dimensional control information specifying the frequency domain.

Division information of the distributed region and the localized region can be reported in a bitmap format. For example, a whole frequency band of a subframe is divided into k bits, so that a frequency band having a bit value of '1' indicates a localized region and a frequency band having a bit value of '0' indicates a localized region. Of course, the other way around is also possible. That is, the frequency band having a bit value of '1' may indicate the distributed region and the frequency band having a bit value of '0' may indicate the localized region. In addition, the distributed region and the localized region can be indicated using a basic unit number.

FIG. 13 shows a method of dividing a data region according to another embodiment of the present invention. This is 2-dimensional division method specifying a frequency domain and a time domain.

Referring to FIG. 13, when a distributed region and a localized region are not spanned during the time domain of one subframe, the 2-dimensional division method is required in which the frequency domain and the time domain are specified. Control information of the 2-dimensional division method may have an increased overhead caused by transmission of the control information in comparison with control information of the 1-dimensional division method, but can effectively use a frequency-time resource. For this, a resource unit number can be used as control information regarding resource allocation.

Information on one distributed region or localized region within a frame can be reported using a start position (or index) of a basic unit for a segmented data region, the number of time-domain basic units in the time domain for an allocated data region, and the number of frequency-domain basic units in the frequency domain. Information on an offset of the frequency domain and the time domain and a start time point thereof can be expressed with a frequency-time starting point at which the frame starts, a first frequency or time starting point at which a segmentation region is applied, etc. A basic unit in association with a position having a greatest offset of the frequency domain and the time domain can be determined using a resource allocation starting point.

In a case where a subframe is divided into a plurality of data regions with respect to the distributed region or the localized region, an overhead caused by control information on resource allocation can increase. To reduce the overhead of the control information on resource allocation, only information on the distributed region may be transmitted and the remaining regions may be configured as the localized regions, or only information on the localized region may be transmitted and the remaining regions may be configured as the distributed regions. In such a case, by transmitting information on both the distributed region and the localized region, the overhead can be reduced more than half.

In addition, in the allocation of a plurality of data regions, a start position of the data region can be determined in various manners by using the basic unit.

FIG. 14 shows a method of determining a start position of a data region according to an embodiment of the present invention.

Referring to FIG. 14, start positions of a plurality of data regions can be determined in various manners by using a basic unit.

In a first method (i.e., Method 1), a start position of a data region can be indicated by information on a frequency-domain basic unit offset and a time-domain basic unit offset. In this case, a frequency-time reference position for the start position of the basic unit may be a frequency-time domain at which a control channel ends or a frequency-time domain at which each subframe starts.

In a second method (i.e., Method 2), a start position of a data region can be indicated by a position (i.e., index or a indicator number) of an actual basic unit. The start position of the data region may be determined to be a position of a smallest or largest basic unit in the data region. Further, 2-dimensional resource allocation information can specify division of an allocation region by simultaneously transmitting two pieces of information on start and end positions of a basic unit of an allocation region. In comparison with information delivery using the first to the third methods mentioned herein, an amount of control information can be reduced most efficiently in the Method 2.

In a third method (i.e., Method 3), for a plurality of data regions, a starting point of a basic unit for a data region first allocated, and a position of a basic unit at a starting point of another data region can be indicated with a differential value. The differential value may denote a difference between basic unit numbers in a frequency domain and/or a time domain.

In a fourth method (i.e., Method 4), if a plurality of data regions have the same start position in a time domain, a start position of a data regions can be indicated in a bitmap format. If a distributed region is allocated, it may be effective to start allocation of the data region at a start position of a frame in consideration of a feedback delay so that a multi-user gain or a frequency selective gain can be obtained by utilizing channel information collected through a feedback channel.

<Logical Frequency-Time Resource Allocation>

(5) Distributed/Localized Sub-Channelization Using the Pre-Defined Permutation Rules Resource allocation in a physical frequency-time domain can be subjected to distributed/located sub-channelization using the pre-defined permutation rules. For physical frequency-time domain allocation, a permutation rule can be applied by separating a distributed/localized region allocated using a logical subchannel generation method. A subchannel can be configured to facilitate sub-channelization of a basic unit, and thus the subchannel can be generated irrespective of allocation of a data region. However, in case of a distributed subchannel, a configuration of a plurality of basic units may be necessary in order to obtain a sufficiency frequency diversity gain. For this, there is a need to set a condition for configuring at least two basic units within a unit time by using the number of distributed subchannels. The unit time is a time corresponding to one basic unit or a basic time unit for the subchannel generation method. When a subchannel is generated for the distributed region or the localized region, a logical subchannel index may be numbered individually for the two regions or may be sequentially and consecutively numbered.

(6) Assignment of Logical Subchannel Indices to Mobile Terminals

After generating and numbering logical subchannels, logical subchannel indices can be assigned to the mobile terminals. That is, the logical subchannel indices are assigned for downlink bursts or uplink bursts allocated to the respective mobile terminals. Control information on logical subchannel index assignment may be transmitted differently according to a distributed subchannel region and a localized subchannel region. In case of the distributed subchannel region, a frequency diversity and inter-cell interference randomization are considered in the subchannel itself. Thus, an overhead of the control information can be reduced by consecutively assigning the subchannel indices to be used by the respective mobile terminals. For example, information on the distributed subchannel can be known by reporting an index of a start position of the distributed subchannel region, the number of subchannels included in the distributed subchannel region, or a last position of a consecutively allocated distributed subchannel. Information on the localized subchannel region can be known by using a bitmap format or information of each subchannel index in some cases where inconsecutive logical subchannels need to be allocated.

(7) Data Mapping on the Assigned Logical Subchannels

Data is mapped to the assigned logical subchannels. In a method of mapping to-be-transmitted data on the logical subchannel region allocated to each mobile terminal, time-domain mapping may be first performed, followed by frequency-domain mapping. Alternatively, the frequency-domain mapping may be first performed, followed by the time-domain mapping. Optionally, data can be mapped according to a pre-defined rule, such as, a hopping scheme or an interleaving scheme in which mapping is carried out with a specific distance. Data can be 1-dimensionally or 2-dimensionally mapped in an allocated region.

FIG. 15 is a block diagram showing constitutional elements of a UE.

Referring to FIG. 15, a UE 50 includes a processor 51, a memory 52, a radio frequency (RF) unit 53, a display unit 54, and a user interface unit 55.

Layers of a radio interface protocol are implemented in the processor 51. The processor 51 provides the control plane and the user plane. The function of each layer can be implemented in the processor 51. The processor 51 divides a physical band into at least one frequency partition, and each frequency partition is divided into a localized region and a distributed region in a frequency domain. The processor 51 maps the at least one frequency partition into at least one logical resource unit. In this case, the localized region is directly mapped into the logical resource unit, and the distributed region is mapped into the logical resource unit by rearranging subcarriers according to a pre-defined permutation rule.

The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method for receiving data by a receiver, the method comprising:

receiving a radio signal comprising a frame which includes an information region and a data region; and demodulating the received radio signal by an OFDM (Orthogonal Frequency Division Multiplexing) scheme, wherein the frame includes a plurality of OFDM symbols in a time dimension and a plurality of subcarriers in a frequency dimension, wherein the data region is divided into a first data region including a first type of one or more resource units and a second data region including a second type of one or more resource units, wherein data in the first type of one or more resource units are mapped to the first data region by a first mapping scheme and data in the second type of one or more resource units are mapped to the second data region by a second mapping scheme other than the first mapping scheme, and wherein the information region includes information to identify resource units as the first type or the second type.

2. The method of claim 1, wherein the information region further includes information to indicate a start position of at least one of the resource units.

3. The method of claim 1, wherein the information region further includes information related to a number of the resource units within the frame.

4. The method of claim 1, wherein the information region is divided into a first information part and a second information part, wherein the first information part includes at least one of information to indicate a size of the second information part or information to indicate a coding scheme of the second information part, and wherein the second information part includes the information to identify the type of each of the resource units.

5. The method of claim 1, wherein the first mapping scheme allocates the data in the first type of one or more resource units to subcarriers of the first data region in the frequency dimension in a consecutive manner and the second mapping scheme allocates the data in the second type of one or more resource units to subcarriers of the second data region in the frequency dimension in a distributed manner.

6. An apparatus for receiving data, the apparatus comprising:

a receiver that receives a radio signal comprising a frame which includes an information region and a data region; and a processor, operatively coupled to the receiver, that demodulates the received radio signal by an OFDM (Orthogonal Frequency Division Multiplexing) scheme, wherein the frame includes a plurality of OFDM symbols in a time dimension and a plurality of subcarriers in a frequency dimension, wherein the data region is divided into a first data region including a first type of one or more resource units and a second data region including a second type of one or more resource units, wherein data in the first type of one or more resource units are mapped to the first data region by a first mapping scheme and data in the second type of one or more resource units are mapped to the second data region by a second mapping scheme other than the first mapping scheme, and wherein the information region includes information to identify resource units as the first type or the second type.

7. The apparatus of claim 6, wherein the information region further includes information to indicate a start position of at least one of the resource units.

8. The apparatus of claim 6, wherein the information region further includes information related to a number of the resource units within the frame.

9. The apparatus of claim 6, wherein the information region is divided into a first information part and a second information part, wherein the first information part includes at least one of information to indicate a size of the second information part or information to indicate a coding scheme of the second information part, and wherein the second information part includes the information to identify the type of each of the resource units.

10. The apparatus of claim 6, wherein the first mapping scheme allocates the data in the first type of one or more resource units to subcarriers of the first data region in the frequency dimension in a consecutive manner and the second mapping scheme allocates the data in the second type of one or more resource units to subcarriers of the second data region in the frequency dimension in a distributed manner.

* * * * *